(12) United States Patent
Desseroir et al.

(10) Patent No.: US 10,144,672 B2
(45) Date of Patent: Dec. 4, 2018

(54) METHOD FOR PREPARING A SUPERPLASTICIZER

(75) Inventors: Alexandre Desseroir, Sainville (FR); Philippe Maitrasse, Chilleurs aux Bois (FR)

(73) Assignee: CHRYSO, Issy les Moulineaux (FR)

( * ) Notice: Subject to any disclaimer, the term of this patent is extended or adjusted under 35 U.S.C. 154(b) by 0 days.

(21) Appl. No.: 13/262,543

(22) PCT Filed: Mar. 30, 2010

(86) PCT No.: PCT/FR2010/050578
§ 371 (c)(1),
(2), (4) Date: Dec. 12, 2011

(87) PCT Pub. No.: WO2010/112750
PCT Pub. Date: Oct. 7, 2010

(65) Prior Publication Data
US 2012/0077940 A1    Mar. 29, 2012

(30) Foreign Application Priority Data
Apr. 1, 2009   (FR) ..................................... 09 52098

(51) Int. Cl.
| | |
|---|---|
| *C08G 81/02* | (2006.01) |
| *C04B 24/26* | (2006.01) |
| *C04B 103/32* | (2006.01) |

(52) U.S. Cl.
CPC ........ *C04B 24/2647* (2013.01); *C08G 81/025* (2013.01); *C04B 2103/32* (2013.01)

(58) Field of Classification Search
CPC ............ C04B 2103/32; C04B 24/2647; C08G 81/025
USPC ....... 106/810, 823, 728; 524/558, 5; 528/77, 528/274; 526/318–332; 525/329.8, 327.5
See application file for complete search history.

(56) References Cited

U.S. PATENT DOCUMENTS 5,436,314 A * 7/1995 Yang et al. .................. 528/274
5,614,017 A * 3/1997 Shawl .......................... 106/823

FOREIGN PATENT DOCUMENTS

| | | |
|---|---|---|
| EP | 0446621 | 9/1991 |
| FR | 2120542 | 8/1972 |
| FR | 2776285 | 9/1999 |
| JP | 63-112608 | 5/1988 |
| JP | 2000212129 | 8/2000 |

OTHER PUBLICATIONS

You, Chang-Jiang et al., "Catalytic Esterification and Kinetic Study of Polyethylene Oxide and Acrylic Acid", Database Chemabs Chemical Abstracts Service, Jun. 23, 2005, 1 page.
International Search Report and Written Opinion for corresponding PCT/FR2010/050578 dated Sep. 30, 2010, 10 pages.
Burwell, Jr., "The Cleavage of Ethers", Chemical Reviews, 1954, p. 615, 632.
Sebastian et al., "Metal Complexes of Poly(Acrylic Acid): Synthesis, Characterization and Thermogravimetric Studies", Polymer Degradation and Stability, 1998, pp. 371-375, vol. 60.

* cited by examiner

*Primary Examiner* — Liam J Heincer
(74) *Attorney, Agent, or Firm* — Thompson Coburn LLP (57) ABSTRACT

The invention chiefly concerns a method for preparing polyalkoxylated polycarboxylates in which the following are caused to react in the presence of water and a catalyst at a temperature of between 120 and 250° C.:
  at least one polycarboxylic acid obtained by polymerization of at least one unsaturated carboxylic acid; and
  at least one polyether carrying a free hydroxyl group capable of reacting with a carboxylic function of the said polycarboxylic acid, characterized in that the catalyst is an alkaline or alkaline-earth salt of a strong protic acid.

12 Claims, 7 Drawing Sheets

METHOD FOR PREPARING A SUPERPLASTICIZER

CROSS-REFERENCE TO RELATED APPLICATIONS

This application is a National Stage application of International Patent Application No. PCT/FR2010/050578, filed on Mar. 30, 2010, which is incorporated by reference herein in its entirety, which claims the benefit of French Application No. 09 52098, filed Apr. 1, 2009, which is incorporated by reference herein in its entirety.

The present invention concerns a method for preparing polyalkoxylated polycarboxylate (co)polymers useful in particular as superplasticizers.

The discovery of the exceptional dispersing properties of comb polyalkoxylated polycarboxylate (co)polymers (PCPs), also called superplasticizers, has allowed concrete technology to progress rapidly; it has become possible to manufacture fluid concretes that are much easier to apply.

These superplasticizers are (co)polymers having a comb structure, whose main polymeric chain comprises carboxylic groups which carry side chains composed of polyether-type sequences.

The preparation of these (co)polymers by esterifying a polycarboxylic acid with a polyether in the presence of an alkaline catalyst is described in the patent to Chryso FR2776285.

However this method is not entirely satisfactory in terms of reaction kinetics and polyether conversion when the polyalkylene glycol is of high molecular weight and/or comprises oxypropylene units. Also, it may give disappointing results with some polycarboxylic acids such as those derived for example from acrylic acid and maleic anhydride.

It is also known to use strong acids such as p-toluenesulfonic or methanesulfonic acid as catalyst for esterification of the polycarboxylic acid with a polyether. However, during the reaction with polyethers of high molecular weight at a temperature of 175° C., chain cleavages are observed which generate a rise in the viscosity of the reaction medium via reactions of cross-linking type, gelling and the risk of setting of the reaction medium.

The document U.S. Pat. No. 5,614,017 describes the catalysis of this reaction with strong acids, optionally formed in situ from a salt such as zinc triflate. The reaction is conducted under conditions favourable for partial cleavage of the polyether. It has been ascertained that the use of zinc triflate limits the conversion rate and affects the length of the polyether chains.

The objective of the present invention is to propose a method for preparing polyalkoxylated polycarboxylic (co)polymers of interest for improving the viscosity of hydraulic compositions, which affords a good conversion rate even when the polyether has a high content of oxypropylene groups and/or a high molecular weight, or when the polycarboxylic acid comprises different units of methacrylic acid.

The term «methacrylic acid» encompasses acrylic acid and methacrylic acid.

These objectives are reached with a method for preparing polyalkoxylated polycarbonates in which the following are caused to react in the presence of water and a catalyst, at a temperature of between 120 and 250° C.:
at least one polycarboxylic acid obtained by polymerizing at least one unsaturated carboxylic acid; and
at least one polyether carrying a free hydroxyl group capable of reacting with a carboxylic function of the said polycarboxylic acid,
the said method being characterized in that the catalyst is an alkaline or alkaline-earth salt of a strong protic acid.

By the term «strong protic acid» it is meant to designate acids capable of releasing one or more protons and having a pKa of less than 0.

It has effectively been evidenced that the use of a neutralized strong protic acid allows an improvement in the conversion rate of polyethers, without any chain cleavages, whilst having sufficient catalytic activity to allow the esterification reaction.

It has also been shown that the use of some salts of strong acids allows a reduction in the (co)polymer content of compounds of high molecular weight.

Finally, it has been observed that the proposed catalysts, no doubt on account of improved compatibility between the polycarboxylic acid and the polyether, most often ensure a reaction in a homogeneous medium, which is not always the case for other catalysts such as LiOH.

Preferably, the catalyst is a salt of a strong protic acid comprising a hydrocarbon group. Such acids can be chosen from the group composed of alkyl-, alkylaryl-, aryl- or arylalkylsulfonic acids, alkyl-, alkylaryl-, aryl- or arylalkylphosphoric acids, alkyl-, alkylaryl-, aryl- or arylalkylphosphonic acids, and acid alkyl-, alkylaryl-, aryl- or arylalkylsulfates, optionally substituted by halogen or by oxyalkylene groups in particular alkyl-polyoxyalkylene, alkylaryl polyoxyalkylene, aryl polyoxyalkylene, the alkylene preferably being ethylene and the number of repeating oxyalkylene units possibly varying from 0 to 100.

Particularly preferred are the catalysts chosen from the salts of alkylsulfonic, arylsulfonic, alkylarylsulfonic or arylalkylsulfonic acids, such as the sodium, potassium, lithium, calcium and magnesium salts of p-toluenesulfonic acid.

Advantageously, the catalyst is added in a quantity of 0.04% to mole %, relative to the number of carboxylic functions of the polycarboxylic acid.

In the method of the invention, the polycarboxylic acid is preferably chosen from among the homopolymers and copolymers of methacrylic acid and the copolymers of methacrylic acid and maleic acid or maleic anhydride.

The polyether may in particular be an alkylether of polyalkylene glycol with the formula:

$$HO-Q-R^3$$

where:
$R^3$ is H or an alkyl, aryl, alkylaryl, arylalkyl group with 1 to 20 carbon atoms, and Q is of formula (II):

where:
$Y_1$ is an alkylene group with 2 carbon atoms;
$Y_2$ is a alkylene group with 3 carbon atoms;
$Y_3$ is an alkylene group with 4 carbon atoms;
n is a integer varying from 3 to 500;
m is a integer varying from 0 to 150; and
q is an integer varying from 0 to 150,
The indication «co» indexing the brackets in formula (II) means that the groups $Y_1O$ to $Y_3O$ may be distributed in the Q group in any manner, in blocks, in sequence or statistically. Preferably, they are distributed statistically.

When several polyethers are used in a mixture, it is not necessary for each one to comprise $Y_2O$ or $Y_3O$ groups. However, the mean ratio n/(n+m+q) preferably varies between 0.2 and 1, preferably between 0.5 and 0.99.

According to one preferred embodiment, 5 to 80 mole %, and advantageously 20 to 70 mole % of polyether are added, relative to the number of carboxylic functions available in the polycarboxylic acid.

The (co)polymer can be obtained by partial esterification catalyzed through the addition of a salt such as defined above. Said esterification does not lead to significant cleavage of the polyether chains, which means that the weight average molecular weight of the polyether before esterification is substantially equal to that of the polyether chains of the dispersant obtained using the method of the invention.

Preferably, the salt used as catalyst for partial esterification is chosen from among the salts of strong protic acids such as alkyl-, alkylaryl-, aryl- or arylalkylsulfonic acids, alkyl-, alkylaryl-, aryl- or arylalkylphosphoric acids, alkyl-, alkylaryl-, aryl- or arylalkylphosphonic acids and acid alkyl-, alkylaryl-, aryl- or arylalkylsulfates. These acids may optionally be substituted by halogen or by alkoxyl groups, in particular alkyl-polyalkyleneoxide, alkylaryl polyalkyleneoxide, aryl polyalkylene oxide, the alkylene preferably being ethylene and the number of repeating oxyalkylene units possibly varying from 0 to 100. As an example, COGNIS proposes a sodium salt of alcohol sulfates comprising 12 to 14 carbon atoms ethoxylated with 4 repeat units of ethylene oxide.

The salts most particularly targeted are the salts of alkylsulfonic, alkylarylsulfonic or arylalkylsulfonic acids, such as the salts of p-toluenesulfonic acid.

The catalyst is an alkaline or alkaline-earth salt of the above-defined acids, and particularly includes the salts of Na, K, Li, Ca and Mg.

It is preferable to use cations scarcely liable to be complexed by the carboxylic groups of the polycarboxylic acid, the effect of which could be to release the catalyst in its acid form, thereby leading to the risk of cleavage of the polyether chains. Those salts particularly preferred are those allowing a reaction in a homogeneous medium. Amongst these salts, particular mention may be made of sodium p-toluenesulfonate.

In general, it is preferable to add to the reaction medium at least 0.04 mole % of catalyst relative to the number of carboxylic functions of the polycarboxylic acid. Further preferably, the quantity of catalyst is no more than 10 mole % relative to the number of carboxylic functions of the polycarboxylic acid.

Preferably, the polycarboxylic acid used to prepare the (co)polymer is obtained by polymerization of a mixture of monomers containing methacrylic acid as essential component. By «essential component» is meant a proportion of at least 50%, preferably at least 80%, and more particularly at least 90% by weight of the component relative to the totality of the monomers. According to one embodiment, the polycarboxylic acid is obtained by polymerization of methacrylic acid with the exclusion of other monomers. Optionally, the polycarboxylic acid may also be derived from other comonomers comprising a different functionality from a carboxylic acid with one or more ethylene unsaturations possibly being co-polymerized with methacrylic acid, such as maleic acid and the anhydride of maleic acid.

Among these monomers, particular mention may be made of the alkyl methacrylates (R=C1 to C22), the aromatic derivatives and the vinyl methallyl derivatives. Of particular interest are the monomers carrying strong acid functions such as sulfonic acids, acid sulfates, phosphoric acids and phosphonic acids since these monomers may act as catalyst when they are partly or fully neutralized.

Preferably, the polycarboxlic acid is a homopolymer and/or a copolymer of methacrylic acid or a copolymer of methacrylic acid and maleic acid or maleic anhydride.

The weight average molecular weight Mw of the polycarboxylic acid used in the method of the invention is preferably between 500 and 60000.

The polycarboxylic acid to be esterified is preferably an aqueous solution miscible with the polyether(s) or a solid soluble in the polyether(s).

The polyether containing a free hydroxyl group used to prepare the copolymer is advantageously an alkylether of polyalkylene glycol, preferably a mixture of alkylethers of polyalkylene glycol of formula:

where:
$R^3$ is H or an alkyl, aryl, alkylaryl, arylalkyl group with 1 to 20 carbon atoms, preferably methyl, and Q has the formula (II):

where:
$Y_1$ is an alkylene group with 2 carbon atoms;
$Y_2$ is an alkylene group with 3 carbon atoms;
$Y_3$ is an alkylene group with 4 carbon atoms;
n is an integer varying from 3 to 500;
m is an integer varying from 0 to 150; and
q is an integer varying from 0 to 150.

The indication «co» indexing the brackets in formula (II) means that the groups $Y_1$ O to $Y_3$O may be distributed within the Q group in any manner, in blocks, in sequence or statistically. Preferably, they are distributed statistically.

When several polyethers are used in a mixture, it is not necessary for each one to comprise $Y_2O$ or $Y_3O$ groups. However, the mean ratio n/(n+m+q) preferably varies between 0.2 and 1, preferably from 0.3 to 0.99.

Therefore, provided the above-mentioned conditions are observed, a mixture of alkylethers of polyalkylene glycol may contain one or more alkylethers of polyalkylene glycol of formula HO-Q-$R^3$ in which m and q equal 0.

The preferred polyethers are those of formula HOQ-$R^3$, in which Q is of formula (II) where:
$R^3$ is a methyl or ethyl group;
n is an integer varying from 3 to 150, preferably from 5 to 50;
m is an integer varying from 1 to 50, preferably from 1 to 25;
q is 0; and
the mean ratio n/(n+m+q) varies from 0.5 to 0.99.
Preferably, the polyether is formed of:
one or more alkylethers of polyethylene glycol containing oxypropylene units, differing in their weight average molecular weight; or
one or more alkylethers of polypropylene glycol containing oxyethylene units, differing in their weight average molecular weight, or
a mixture of the alkylethers thus defined.
The mean molecular weight of the polyether may vary from 150 to 30 000, preferably from 300 to 10000, more preferably from 300 to 5000.

Particularly satisfactory results were achieved with the dispersants obtained from at least one polycarboxylic acid and at least one polyether containing a free hydroxyl group chosen from among:

a methylether of polyalkylene glycol containing 3 to 150 oxyalkylene units, preferably oxyethylene and optionally oxypropylene, the mean molar ratio of the oxyethylene units to the oxyalkylene units (YO) being about 0.2 to 1.

or a mixture of these methylethers of polyalkylene glycol which essentially differ in their number of oxyalkylene units.

In addition to the alkylether(s) of polyalkylene glycol, provision may be made in the reaction medium for one or more polyethers carrying at least two free hydroxyl groups, in limited quantity.

Also, in limited quantity, provision may be made for a polyalkylene glycol or a mixture of polyalkylene glycols comprising an alkyl, aryl or alkyl aryl chain, whether or not branched, having 8 to 22 carbon atoms. However, the quantity of these polyalkylene glycols is preferably less than 10%, more preferably less than 2 mole % relative to the number of carboxylic functions of the polycarboxylic acid.

The quantity of polyether used in the described method depends upon the desired extent of esterification.

Advantageously, the partial esterification reaction is conducted in order to esterify 5 to 80%, preferably 20 to 70% of the carboxylic functions with a polyether or a mixture of polyethers.

The partial esterification reaction is preferably conducted under reduced pressure in order progressively to eliminate the water formed during the reaction. The reduced pressure is generally between 5 and 150 mbars.

The esterification reaction is stopped as soon as the targeted percentage of esterified carboxylic functions of the polycarboxylic acid is reached.

The weight average molecular weight «Mw» of the (co)polymer obtained, measured by gel permeation chromatography with polyethylene glycol calibration, generally varies between about 1000 and about 1 000 000, preferably between about 10 000 and about 80 000.

The (co)polymer thus prepared has dispersing properties of interest. It can be used with hydraulic cement-based compositions such as Portland CEM I cements; alumina cement, various CEM II or CEM III composite cements formed by mixing, before or after crushing Portland clinker and slag, of natural pozzolana and/or fly ash; or hydraulic materials other than cement such as hydraulic calcium sulfates, binders containing calcium sulfo-aluminates (CSAs), hydraulic glass, magnesium and phosphate binders.

In the following figures and examples, the invention is described in more detail.

EXAMPLES

Example A (Comparative Example)

To a four-necked flask fitted with a stirrer and heating means and connected to a water-jet pump, 25 g of polyacrylic acid were added (Mw=2000, measured acid titre=330 mg KOH/g, dry extract 49% by weight) followed by 0.34 g (5.5 mole % of the carboxylic functions of the polyacrylic acid) of lithium hydroxide. To the medium were then added 73.66 g (25 mole % of the carboxylic functions of the polyacrylic acid) of methoxylated ethylene polyoxide (MPEG2000). The reaction medium was brought to a temperature of 80° C. and gradually placed under a vacuum (pressure of about 50 mbar). On completion of water distillation, the temperature of the reaction medium was gradually brought to 175° C. The reaction time was measured starting from the time when the reaction medium reached 170° C. The reaction was continued for a time of 6 hours.

The progress of the esterification reaction was monitored by assay of non-reacted MPEG, using GPC, by comparing the area of the peak with a previously determined calibration curve.

After the reaction, the reaction medium was returned to atmospheric pressure and the heating halted. Once the temperature of the reaction medium had fallen to below 90° C., the molten polymer was diluted in water to 50% by weight.

Figure 1:
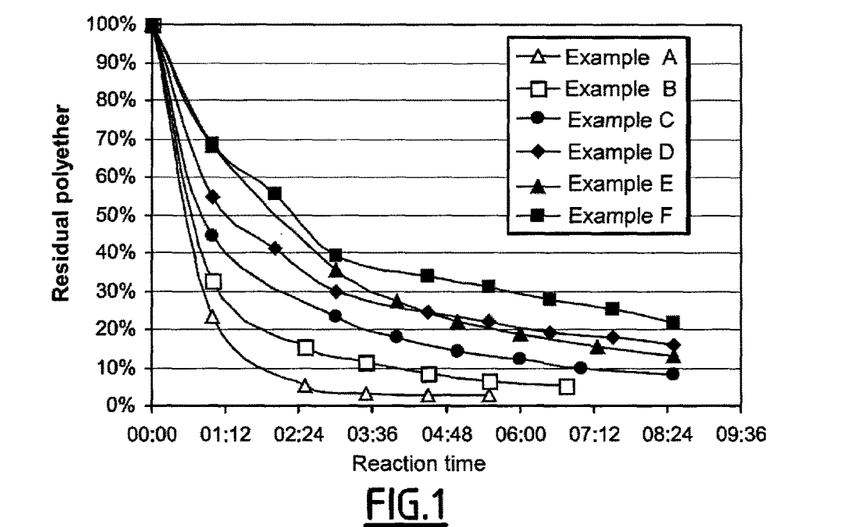
FIG. 1 shows the reaction kinetics and residual polyether of copolymers prepared with a basic catalyst (Examples A to F)
Figure 2:
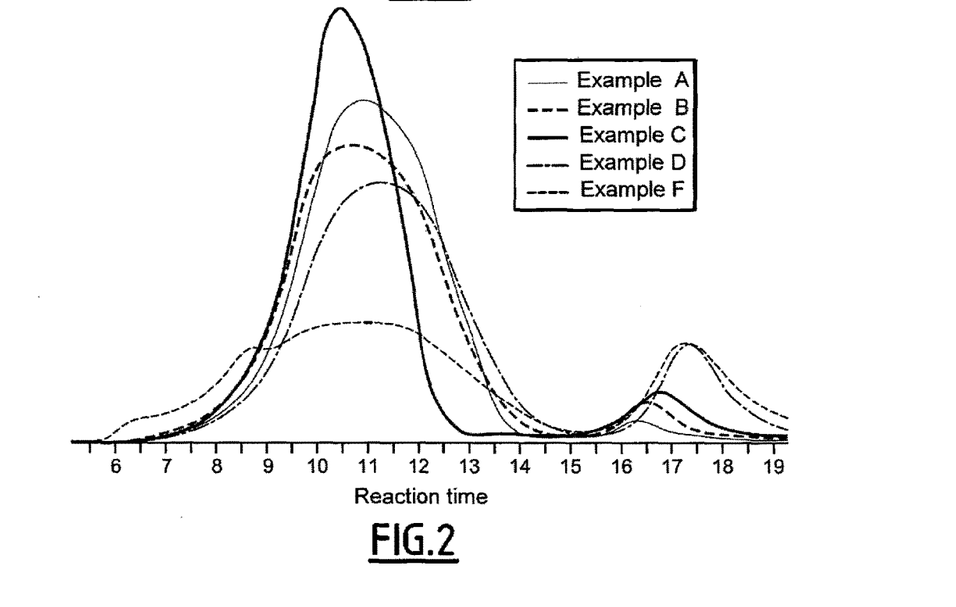
FIG. 2 shows gel permeation chromatographies of copolymers prepared with a basic catalyst (Examples A to F)

The kinetics obtained with the assay of non-reacted polyether are given in FIG. 1 and the residual polyether content is given I Table 1 below. Gel permeation chromatography is illustrated in FIG. 2.

Example B to F (Comparative Examples)

The reaction according to Example A was repeated replacing the methoxylated ethylene polyoxide by 73.66 g (25 mole % of the carboxylic functions of the polyacrylic acid) of ethylene polyoxide/propylene polyoxide of molecular weight Mw 2000 respectively containing 10%, 20%, 30%, 40% and 50 mole % of propylene oxide statistically distributed along the chain, which terminated in a methoxy group.

The alkoxlylated polyethers used according to the present invention were obtained by living polymerization of epoxy monomers comprising 2 to 4 carbon atoms. The polymers may be homopolymers or copolymers comprising repeat units linked together via ether bonds. Preferably, the epoxides comprise the propylene oxide and ethylene oxide units. The polyethers according to the preceding description and their method of preparation are well known to persons skilled in the art. One method for the preparation thereof consists for example of using an alkaline base or a metal in the presence of a mono-alcohol, a glycol or any other substance comprising a labile hydrogen. This mixture is then contacted with epoxides for polymerization by opening the oxirane rings with or without solvent. At the end of the reaction, hydrolysis is performed to obtain the corresponding polyalkoxylated compound.

The kinetics obtained are given in FIG. 1 and the residual polyether content is given in Table 1 below. The gel permeation chromatographies of the compounds are given in FIG. 2.

TABLE 1

Comparative examples

| Example | Polycarboxylic acid | Polyether Molecular weight | Polyether Oxyprop. [mole %] | Targeted ester content [mole %] | Residual polyether [weight %] |
|---|---|---|---|---|---|
| A | Acrylic | 2000 | 0 | 25 | 4.7 |
| B | Acrylic | 2000 | 10 | 25 | 6.5 |
| C | Acrylic | 2000 | 20 | 25 | 9.9 |
| D | Acrylic | 2000 | 30 | 25 | 18.1 |
| E | Acrylic | 2000 | 40 | 25 | 16.0 |
| F | Acrylic | 2000 | 50 | 25 | 26.1 |
| G | Acrylic | 2000 | 50 | 30 | 44.0 |
| H | Acrylic/Maleic 50:50 | 2000 | 0 | 25 | 50.0 |
| I | Acrylic/Maleic 50:50 | 2000 | 10 | 25 | 70.0 |
| J | Methacrylic | 2000 | 10 | 25 | 3.5 |
| K | Acrylic | 2000 | 50 | 30 | 55.5 |

The results of Examples A to F evidence slowing of the kinetics when the OP content increases in the polyether. On this account, a high content of non-converted polyether remains in the polymer, which reduces the economic value of the method.

Gel permeation chromatographies also show an increase in polydispersity when the propylene oxide content increases.

Example 1

First a catalyst solution was prepared by neutralizing p-toluene sulfonic acid in an aqueous solution, whose pH was brought to a pH of between 7 and 10 using sodium hydroxide (to 50% then 1 N and finally 0.1 N).

To a four-necked flask fitted with a stirrer and heating means and connected to a water-jet pump, 25 g of polyacrylic acid were added (Mw=2000, measured acid titre=330 mg KOH/g, dry extract 49% by weight) followed by 0.86 g (28.7 g of a 3 weight %, 3 mole % solution of the carboxylic functions of the polyacrylic acid) of sodium p-toluenesulfonate.

To the medium were then added 73.66 g (25 mole % of the carboxylic functions of the polyacrylic acid) of ethylene polyoxide/propylene polyoxide of molecular weight Mw 2000 containing 50 mole % of propylene oxide statistically distributed along the chain, which terminated in a methoxy group.

The reaction medium was brought to a temperature of 80° C. and gradually placed under a vacuum (pressure of about 50 mbar). On completion of water distillation, the temperature of the reaction medium was gradually brought to 175° C. The reaction time was measured starting from the time when the reaction medium reached 170° C. The reaction was continued for a time of 8 h30.

The progress of the esterification reaction was monitored by assay of the non-reacted MPEG (methoxy-terminated polyether), using GPC by comparing the area of the peak with a previously determined calibration curve.

After the reaction, the reaction medium was returned to atmospheric pressure and heating halted. Once the temperature of the reaction medium had fallen to below 90° C., the molten polymer was diluted in water to 50 weight %.

Figure 3:
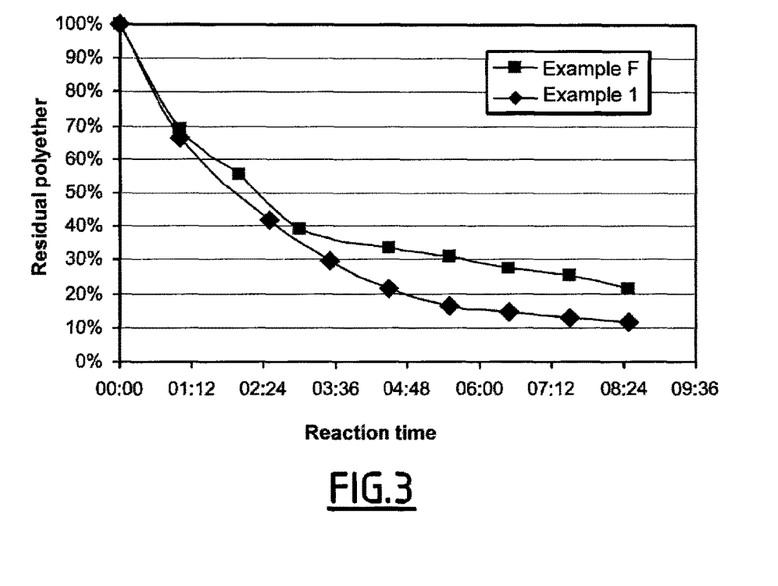
FIG. 3 compares the reaction kinetics and the residual polyether of copolymers prepared with a basic catalyst and an alkaline salt of a strong protic acid (Example F and Example 1)

The residual polyether content is given in Table 2 below and in FIG. 3. Improved progress can be observed in the conversion rate of the polyether with sodium p-toluenesulfonate compared with lithium hydroxide.

Figure 4:
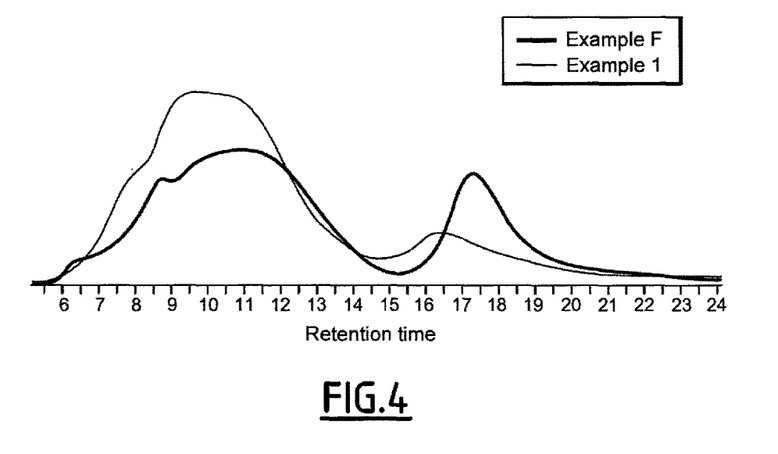
FIG. 4 compares the gel permeation chromatographies of copolymers with a basic catalyst and alkaline salt of a strong protic acid (Example F and Example 1)

Gel permeation chromatography of the copolymer obtained, compared with the one prepared according to Example F (FIG. 4) shows narrowing of the shoulder located at a retention time of around 10 minutes, which indicates a decrease in the proportion of high molecular weight compounds for the copolymer prepared according to Example 1. The comparison of the second peak located at a retention time of around 17 minutes indicates an increase in the conversion of the polyether with the method according to Example 1.

TABLE 2

Examples according to the invention

| Example | Polycarboxylic acid | Polyether Molecular weight | Polyether Oxyprop. [mole %] | Targeted ester content [mole %] | Residual polyether [weight %] |
|---|---|---|---|---|---|
| 1 | Acrylic | 2000 | 50 | 25 | 11.5 |
| 2 | Acrylic | 2000 | 10 | 25 | 2.2 |
| 3 | Acrylic | 2000 | 10* | 25 | 8.5 |
| 4 | Acrylic | 2000 | 50 | 30 | 8.4 |
| 5 | Acrylic | 2000 | 50 | 35 | 15.4 |
| 6 | Acrylic | 2000/350 | 50/0 | 35 | 10.1 |
| 7 | Acrylic | 2000/350 | 50/0 | 45 | 10.9 |
| 8 | Acrylic | 2000/350 | 50/0 | 55 | 13.6 |
| 9 | Acrylic/Maleic 50:50 | 2000 | 0 | 25 | 15.0 |
| 10 | Acrylic/Maleic 50:50 | 2000 | 10 | 25 | 22.0 |
| 11 | Acrylic/Maleic 80:20 | 2000 | 0 | 25 | 2.3 |
| 12 | Acryli /Maleic 80:20 | 2000 | 10 | 25 | 6.0 |
| 13 | Methacrylic | 2000 | 10 | 25 | 5.4 |

*on average, the polyether comprises chains with 50% and 0% OP

Example 2

Example 1 was repeated by replacing MPEG with MPEG of molecular weight 2000 with 10 mole % oxypropylene units. The reaction was halted after 6 h.

The content of measured residual polyether is given in Table 2 above. A better conversion rate of the polyether can be observed with sodium p-toluenesulfonate as catalyst, compared with Example B.

Example 3

Example 2 was repeated under the same operating conditions but replacing the MPEG of molecular weight 2000 with 10 mole % oxypropylene units by a mixed OP/OE MPEG of same molecular weight comprising a chain with a OP/(OE+OP) molar ratio of 50% and a chain with 100% oxyethylene units. Having regard to the proportion between the 2 chains, on average the MPEG comprised 10 mole % of oxypropylene units per chain. The reaction was halted after 6 hours.

Figure 5:
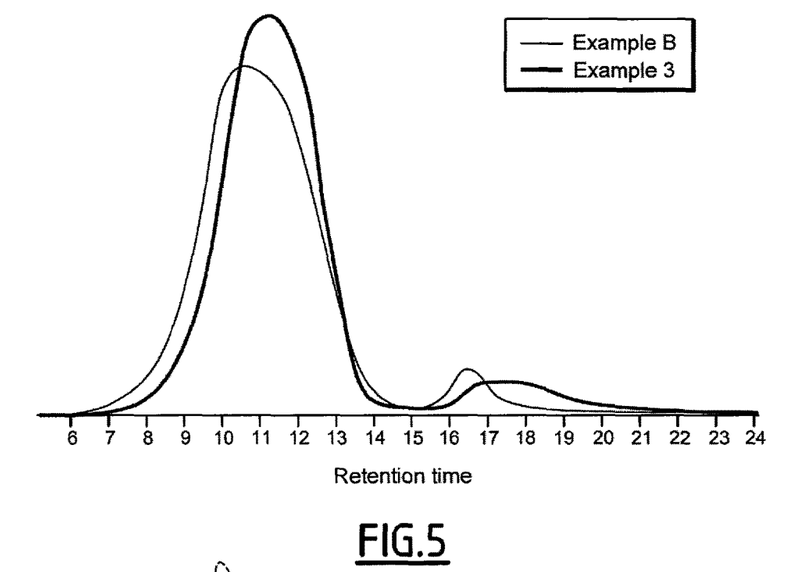
FIG. 5 compares the gel permeation chromatographies of copolymers prepared with a basic catalyst and an alkaline salt of a strong protic acid (Example B and Example 3)

The content of measured residual polyether is given in Table 2 above. Gel permeation chromatography of the copolymer obtained, compared with the copolymer prepared according to Example B (FIG. 5), shows an equivalent polyether conversion rate and an advantage of the copolymer prepared according to Example 3 in terms of monodispersity.

Example 4

Example 1 was repeated under the same operating conditions but replacing the MPEG this time with a mixed OP/OE MPEG of same molecular weight comprising a chain with a an OP/(OE+OP) molar ratio of 50% and targeting an ester content of 30% instead of 25%.

Therefore, the addition was made of 88.39 g (30 mole % of the carboxylic functions of the polyacrylic acid) of ethylene polyoxide/propylene polyoxide of molecular weight Mw 2000 containing 50 mole % of propylene oxide distributed statistically along the chain which terminated with a methoxy group.

The reaction was halted after 12 h.

The content of measured residual polyether is given in Table 2 above.

Example G (Comparative Example)

Example 4 was repeated under the same operating conditions but this time not using sodium p-toluenesulfonate as catalyst but 0.76 g (3 mole % of the carboxylic functions of the polyacrylic acid) of p-toluenesulfonic acid.

The reaction was halted after 8 h. The residual polyether content is given in Table 1.

Figure 7:
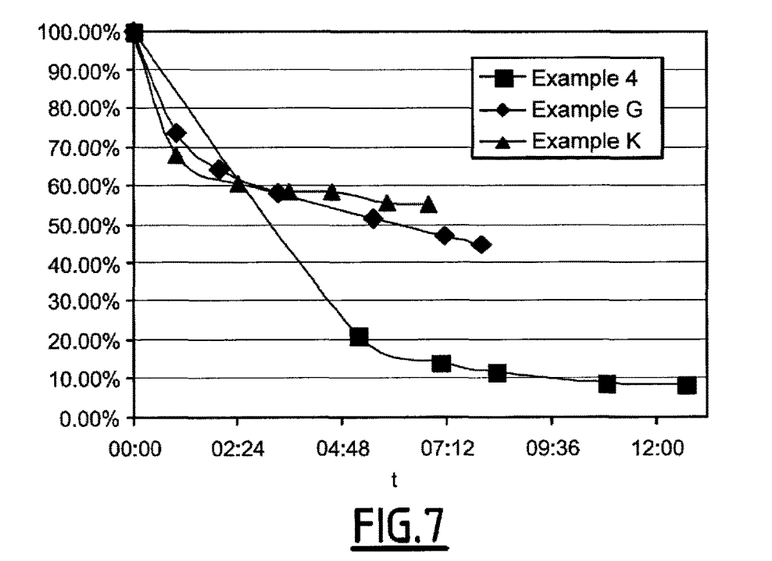
FIG. 7 compares the esterification kinetics of polyacrylic acid using as catalyst p-toluenesulfonic acid, sodium p-toluenesulfonate and zinc triflate (Example 4, Example G and Example K)
Figure 8:
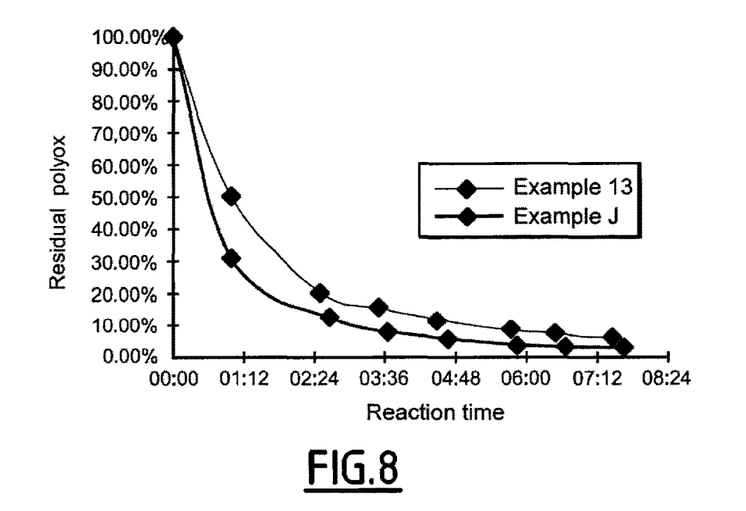
FIG. 8 compares the esterification kinetics of polymethacrylic acid using as catalyst sodium p-toluenesulfonate and with sodium hydroxide (Example 13 and Example J)

Monitoring of the residual polyether content showed that the use of p-toluenesulfonic acid slows the kinetics considerably, compared with the corresponding salt (FIG. 7).

Example 5

Example 4 was again repeated but this time adding the polyether, 103.13 g (35 mole % of the carboxylic functions of the polyacrylic acid), of ethylene polyoxide/propylene polyoxide of molecular weight Mw 2000 containing 50 mole % of propylene oxide statistically distributed along the chain which terminated with a methoxy group.

The reaction was halted after 15 hours.

The low contents of residual polyether shown in the results indicate that it is possible to raise the ester content to values higher than 25% with better conversion of the mixed MPEG, EPO/PPO 2000, when using sodium p-toluenesulfonate.

Example 6

Example 1 was repeated under the same operating conditions but, in addition to the ethylene polyoxide/propylene polyoxide of molecular weight Mw 2000 containing 50 mole % of propylene oxide, by also adding 5.16 g (10 mole % of the carboxylic functions of the polyacrylic acid) of methoxy terminated ethylene polyoxide of molecular weight Mw 350.

The theoretical content of ester therefore increased to 35% for a fixed ester content in the mixed MPEG, EPO/PPO 2000, of 25%.

The reaction was halted after 15 h.

Example 7

Example 1 was repeated under the same operating conditions but, in addition to the ethylene polyoxide/propylene polyoxide of molecular weight Mw 2000 containing 50 mole % of propylene oxide, by also adding 10.31 g (20 mole % of the carboxylic functions of the polyacrylic acid) of methoxy terminated ethylene polyoxide of molecular weight Mw 350.

The theoretical ester content therefore increased to 45% for a fixed ester content in the mixed MPEG, EPO/PPO 2000, of 25%.

The reaction was halted after 17 h.

Example 8

Example 1 was repeated under the same operating conditions but, in addition to the ethylene polyoxide/propylene polyoxide of molecular weight Mw 2000 containing 50 mole % of propylene oxide, by also adding 15.47 g (30 mole % of the carboxylic functions of the polyacrylic acid) of methoxy terminated ethylene polyoxide of molecular weight Mw 350.

The theoretical ester content therefore increased to 55% for a fixed ester content in the mixed MPEG, EPO/PPO 2000, of 25%.

The reaction was halted after 18 h.

Example 9

To a four-necked flask fitted with a stirrer and heating means and connected to a water-jet pump, were added 25 g of acrylic acid and maleic anhydride copolymer in a molar ratio of 50:50 (Mw=3900, calculated acid titre=380.8 mg KOH/g, dry extract 39.65% by weight) followed by 0.89 g (33.0 g of a 3 weight %, 3 mole % solution of the carboxylic functions of the copolymer) of sodium p-toluenesulfonate.

To the medium were then added 85.0 g (25 mole % of the carboxylic functions of the polyacrylic acid) of methoxylated ethylene polyoxide (MPEG2000). The reaction medium was brought to a temperature of 80° C. and gradually placed under a vacuum (pressure of about 50 mbar). On completion of water distillation, the temperature of the reaction medium was gradually brought to 175° C. The reaction time was measured starting from the time when the reaction medium reached 170° C.

The reaction was continued for a time of 8 h. During the reaction, the reaction medium remained homogeneous.

After the reaction, the reaction medium was returned to atmospheric pressure and the heating discontinued. Once the temperature of the reaction medium had fallen to below 90° C., the molten polymer was diluted to 50 weight % in water.

The residual polyether content is given in Table 2.

Example H (Comparative Example)

Example 9 was repeated but replacing the catalyst by 0.39 g (5.5 mole % of the carboxylic functions of the polyacrylic acid) of lithium hydroxide.

The reaction was continued for a time of 8 h. During the reaction, the reaction medium remained heterogeneous.

After the reaction, the reaction medium was returned to atmospheric pressure and the heating discontinued. Once the temperature of the reaction medium had fallen to below 90° C. the molten polymer was diluted to 50 weight % in water.

The residual polyether content is given in Table 1.

Example 10

Example 9 was repeated but using as polyether 73.66 g (25 mole % of the carboxylic functions of the copolymer) of ethylene polyoxide/propylene polyoxide of molecular weight Mw 2000 containing 10 mole % of propylene oxide statistically distributed along the chain, which was terminated with a methoxy group.

The reaction was continued for a time of 8 h. During the reaction, the reaction medium remained homogeneous.

After the reaction, the reaction medium was returned to atmospheric pressure and the heating discontinued. Once the temperature of the reaction medium had fallen to below 90° C., the molten polymer was diluted to 50 weight % in water.

The residual polyether content is given in Table 2.

Example I (Comparative Example)

Example 10 was repeated by replacing the catalyst with 0.39 g (5.5 mole % of the carboxylic functions of the polyacrylic acid) of lithium hydroxide.

The reaction was continued for a time of 8 h. During the reaction the reaction medium remained heterogeneous.

After the reaction, the reaction medium was returned to atmospheric pressure and the heating discontinued. Once the temperature of the reaction medium had fallen to below 90° C., the molten polymer was diluted to 50 weight % in water.

The residual polyether content is given in Table 1.

Example 11

Example 9 was repeated but using as polycarboxylic acid a copolymer of acrylic acid and maleic anhydride in a molar ratio of 80:20 (Mw=2300, calculated acid titre=342.5 mg KOH/g, dry extract 40.26% by weight)

The quantity of catalyst used was 0.89 g (29.67 g of a 3 weight %, 3 mole % solution of the carboxylic functions of the copolymer) of sodium p-toluenesulfonate.

The quantity of methoxy-terminated polyether, without OP, of molecular weight Mw 2000 was 74.46 g (25 mole % of the carboxylic functions of the copolymer).

The reaction was continued for a time of 8 h. During the reaction the reaction medium remained homogeneous.

After the reaction, the reaction medium was returned to atmospheric pressure and the heating discontinued. Once the temperature of the reaction medium had fallen to below 90° C., the molten polymer was diluted to 50 weight % in water.

The residual polyether content is given in Table 2.

Example 12

Example 10 was repeated but using as polycarboxylic acid a copolymer of acrylic acid and maleic ahydride in a molar ratio of 80:20 (molecular weight Mw=2300, calculated acid titre=342.5 mg KOH/g, dry extract 40.26% by weight).

The quantity of catalyst used was 0.89 g (29.67 g of a 3 weight %, 3 mole % solution of the carboxylic functions of the copolymer) of sodium p-toluenesulfonate.

The quantity of polyether of ethylene polyoxide molecular weight Mw 2000/propylene polyoxide molecular weight Mw 2000 containing 10 mole % of propylene oxide distributed statistically along the methoxy terminated chain was 74.46 g (25 mole % of the carboxylic functions of the copolymer).

The reaction was continued for a time of 8 h. During the reaction the reaction medium remained homogeneous.

After the reaction, the reaction medium was returned to atmospheric pressure and the heating discontinued. Once the temperature of the reaction medium had fallen to below 90° C., the molten polymer was diluted to 50 weight % in water.

The residual polyether content is given in Table 2.

Example 13

Example 2 was repeated but using as polycarboxylic acid a polymethacrylic acid (Mw=4000, measured acid titre=184.8 mg KOH/g, dry extract 30.4% by weight).

The quantity of catalyst used was 0.48 g (16.0 g of a 3 weight %, 3 mole % solution of the carboxylic functions of the copolymer) of sodium p-toluenesulfonate.

The quantity of polyether of ethylene polyoxide molecular weight Mw 2000/propylene polyoxide molecular weight Mw 2000 containing 10 mole % of propylene oxide statistically distributed along the methoxy terminated chain, was 41.26 g (25 mole % of the carboxylic functions of the copolymer).

The reaction was continued for a time of 7 h30. During the reaction, the reaction medium remained homogeneous.

After the reaction, the reaction medium was returned to atmospheric pressure and the heating stopped. Once the temperature of the reaction medium had fallen to below 90° C., the molten polymer was diluted to 50 weight % in water.

The residual polyether content is given in Table 2.

Example J (Comparative Example)

Example 13 was repeated under the same operating conditions, but replacing the catalyst by 0.08 g of NaOH (2.5 mole % of the carboxylic functions of the polyacrylic acid).

The reaction was continued for a time of 7 h40. During the reaction, the reaction medium remained homogeneous.

After the reaction, the reaction medium was returned to atmospheric pressure and the heating stopped. Once the temperature of the reaction medium had fallen to below 90° C., the molten polymer was diluted to 50 weight % in water.

The residual polyether content is given in Table 1.

Example K (Comparative Example)

Example 4 was repeated under the same operating conditions, but replacing the catalyst by 1.61 g of zinc triflate (3 mole % of the carboxylic functions of the polyacrylic acid).

The reaction was continued for a time of 6 h50. During the reaction, the reaction medium appeared homogeneous but settled when agitation was stopped.

After the reaction, the reaction medium was returned to atmospheric pressure and the heating stopped. Once the temperature of the reaction medium had fallen to below 90° C., the molten polymer was diluted to 50 weight % in water.

The residual polyether content is given in Table 1.

Monitoring of the residual polyether content (FIG. 7) showed that the use of zinc triflate led to considerably slower kinetics compared with the catalysts used in the claimed method, such as the sodium salt of p-toluenesulfonic acid.

The results of the above examples show that it is possible to prepare copolymers using the method of the invention having ester contents of more than 25% with good conversion rates.

Figure 6:
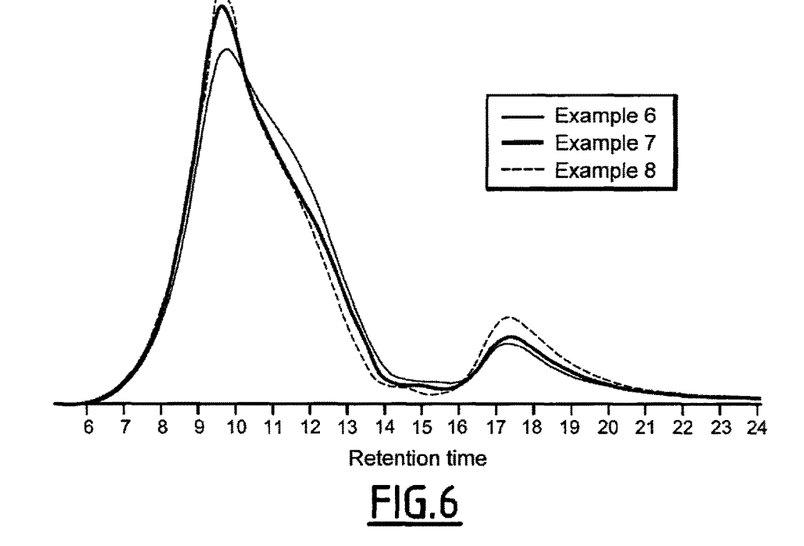
FIG. 6 gives the gel permeation chromatographies of copolymers prepared according to Examples 6, 7 and 8.

The GPC chromatographies of the copolymers prepared according to Examples 6, 7 and 8 (FIG. 6) show that the polydispersity of the polymers is maintained even when the ester content increases, leading to a longer synthesis time.

With the method of the invention, it is therefore possible to ensure the esterification of polycarboxylic acids with polyalkoxides and to obtain good conversion rates even when the polyalkoxides contain high levels of propylene oxide for an equivalent or shorter reaction time.

In addition, it is ascertained that the copolymers prepared using the method of the invention have better polydispersity, and a lower content of products with very high molecular weight.

Figure 9:
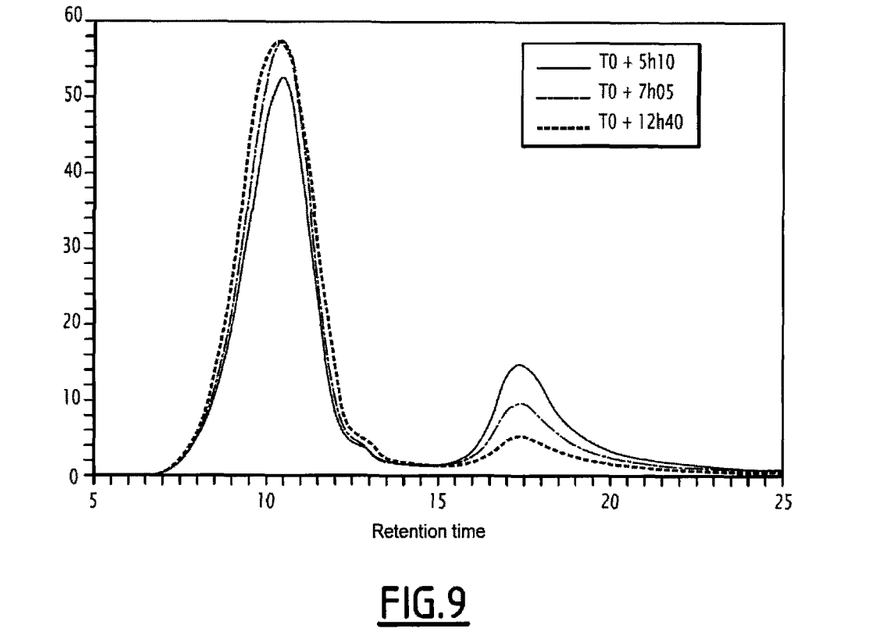
FIG. 9 shows the trend in the distribution of molecular weights during the synthesis in Example 4 (distributions measured on samples taken at 5 h10, 7 h05 and 12 h40 starting from the time the reaction medium reached 170° C. ($T_0$)
Figure 10:
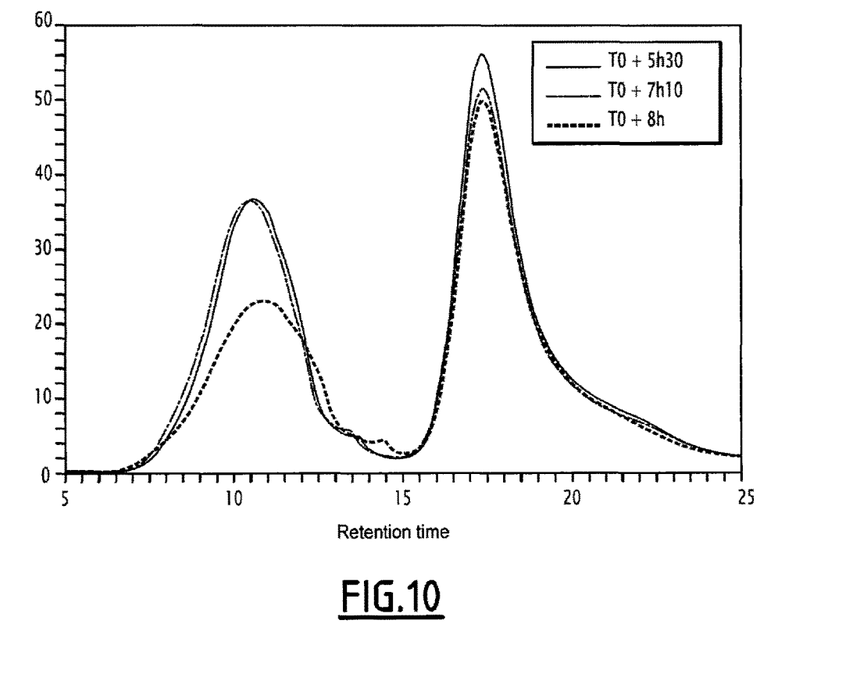
FIG. 10 shows the trend in the distribution of molecular weights during the synthesis in Example G (distributions measured on samples taken at 5 h30, 7 h10 and 8 h00 starting from the time when the reaction medium reached 170° C. ($T_0$)
Figure 11:
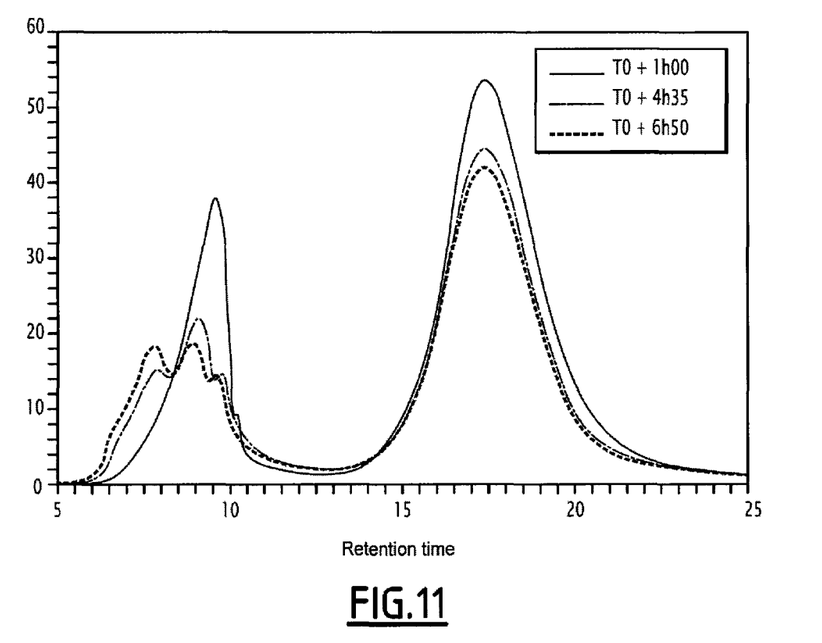
FIG. 11 shows the trend in the distribution of molecular weights during the synthesis in Example K (distributions measured on samples taken at 1 h00, 4 h35 and 6 h50 starting from the time when the reaction medium reached 170° C. ($T_0$).

In FIGS. 9, 10 and 11, the formed polymer is eluted over the retention time range of between 5 and 14 min. The peaks which can be seen between 14 and 25 min are those of the non-grafted polyether. In FIG. 9, which corresponds to monitoring in the method of the invention, the weight distribution of the formed polymer remains narrow throughout the reaction. It can be concluded, that there is little degradation of the polyether chains under the conditions of the invention. On the other hand, for the methods conducted using different catalysts (see FIGS. 10 and 11), the weight distribution of the formed polymer widens throughout synthesis, and multiple shoulders are even seen to occur for the case in FIG. 11 (catalysis with zinc triflate). It can be concluded that there is notable degradation of the polyether in the methods conducted using different catalysts from those of the invention.

In addition, it was observed that the method of the invention allows the esterification of polycarboxylic acids that are difficult to convert using the conventional method, such as the copolymers of acrylic acid with maleic anhydride.

The invention claimed is:

1. A method for preparing polyalkoxylated polycarboxylates wherein the following are caused to react in the presence of water and a catalyst at a temperature of between 12020 C. and 250° C.:
    at least one polycarboxylic acid obtained by polymerization of at least one unsaturated carboxylic acid; and
    at least one polyether carrying a free hydroxyl group capable of reacting with a carboxylic function of the said polycarboxylic acid,
the method being characterized in that the catalyst is an alkaline or alkaline-earth salt of a strong protic acid, and wherein the reaction does not lead to cleavage of the polyether chains.

2. The method according to claim 1, wherein the catalyst is chosen from the group comprising the salts of alkyl-, alkylaryl, aryl, or arylalkylsulfonic acids, alkyl-, alkylaryl-, aryl- or arylalkylphosphoric acids, alkyl-, alkylaryl-, aryl- or arylalkylphosphonic acids, and acid alkyl-, alkylaryl-, aryl- or arylalkylsulfates, the said acids possibly being substituted by halogen or by oxyalkylene groups, in particular alkyl-polyoxyalkylene, alkylaryl polyoxyalkylene and aryl polyoxyalkylene.

3. The method according to claim 2, wherein the catalyst is chosen from among the salts of alkylsulfonic, arylsulfonic, alkylarylsulfonic or arylalkylsulfonic acids.

4. The method according to claim 3, wherein the catalyst is a salt of p-toluenesulfonic acid.

5. The method according to claim 4, wherein the catalyst is chosen from among the sodium, potassium, lithium, calcium and magnesium salts of p-toluenesulfonic acid.

6. The method according to claim 1, wherein the catalyst is added in a quantity of 0.04% to 10 mole % relative to the number of carboxylic functions of the polycarboxylic acid.

7. The method according to claim 1, wherein the polycarboxylic acid is chosen from among the homopolymers and copolymers of methacrylic acid and the copolymers of methacrylic acid and maleic acid or maleic anhydride.

8. The method according to claim 1, wherein the polyether is an alkylether of polyalkylene glycol of formula:

HO-Q-$R^3$ where:
    $R^3$ is H or an alkyl, aryl, alkylaryl, arylalkyl group with 1 to 20 carbon atoms, and Q is of formula (II):

where:
    $Y_1$ is an alkylene group with 2 carbon atoms;
    $Y_2$ is an alkylene group with 3 carbon atoms;
    $Y_3$ is an alkylene group with 4 carbon atoms;
    n is an integer varying from 3 to 500;
    m is an integer varying from 0 to 150; and
    q is a integer varying from 0 to 150.

9. The method according to claim 8, wherein the polyether is of formula HO-Q-$R^3$ in which $R^3$ is a methyl or ethyl group.

10. The method according to claim 1, wherein the polyether is of formula HO-Q-$R^3$ in which Q is of above-mentioned formula (II), in which:
    n is an integer varying from 5 to 50;
    m is an integer varying from 1 to 25; and
    q is 0.

11. The method according to claim 8, wherein the polyether is of formula HO-Q-$R^3$ in which Q is of the above-mentioned formula (II) and in which the mean ratio (n/n+m+q) is between 0.2 and 1.

12. The method according to claim 1, wherein 5 to 80 mole % of polyether are added relative to the number of available carboxylic functions of the polycarboxylic acid.

* * * * *